Aug. 13, 1963  R. A. CLAPP  3,100,419
PHOTOGRAPHIC PRINTER

Filed Jan. 30, 1959  9 Sheets-Sheet 1

INVENTOR
ROY A. CLAPP
Caswell & Lagaard
ATTORNEYS

Aug. 13, 1963  R. A. CLAPP  3,100,419
PHOTOGRAPHIC PRINTER

Filed Jan. 30, 1959  9 Sheets-Sheet 2

INVENTOR
ROY A. CLAPP

Caswell & Lagaard
ATTORNEYS

INVENTOR
ROY A. CLAPP
Caswell & Lagaard
ATTORNEYS

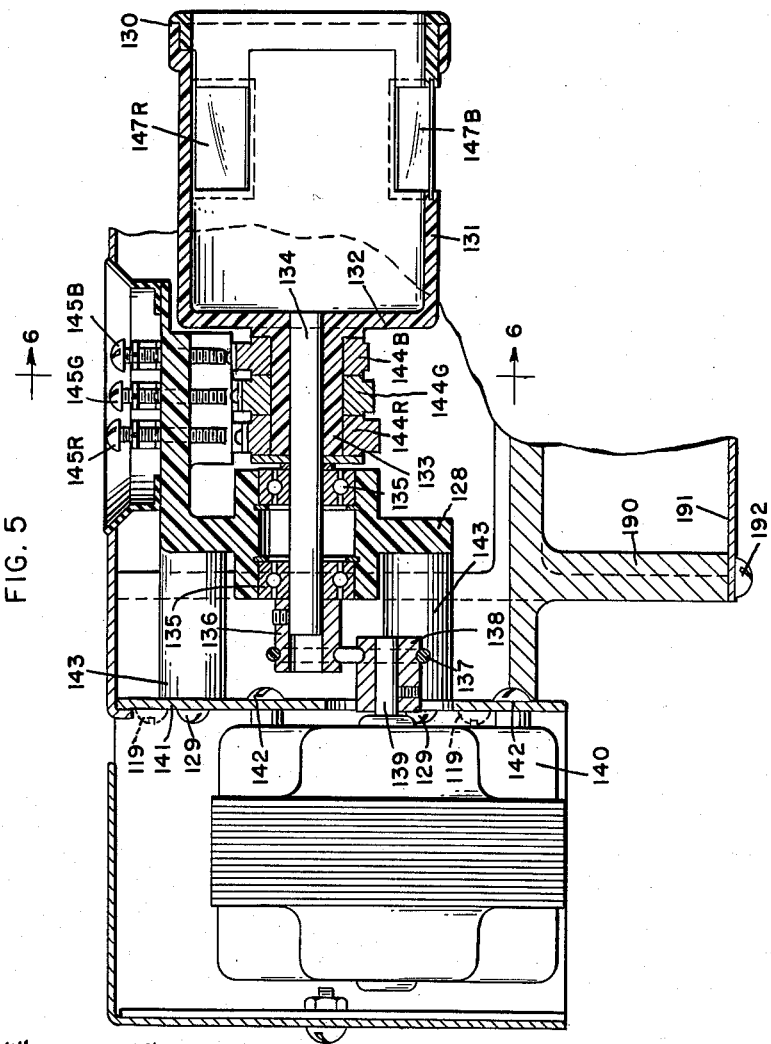
INVENTOR
ROY A. CLAPP
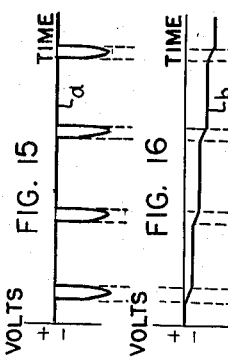
ATTORNEYS

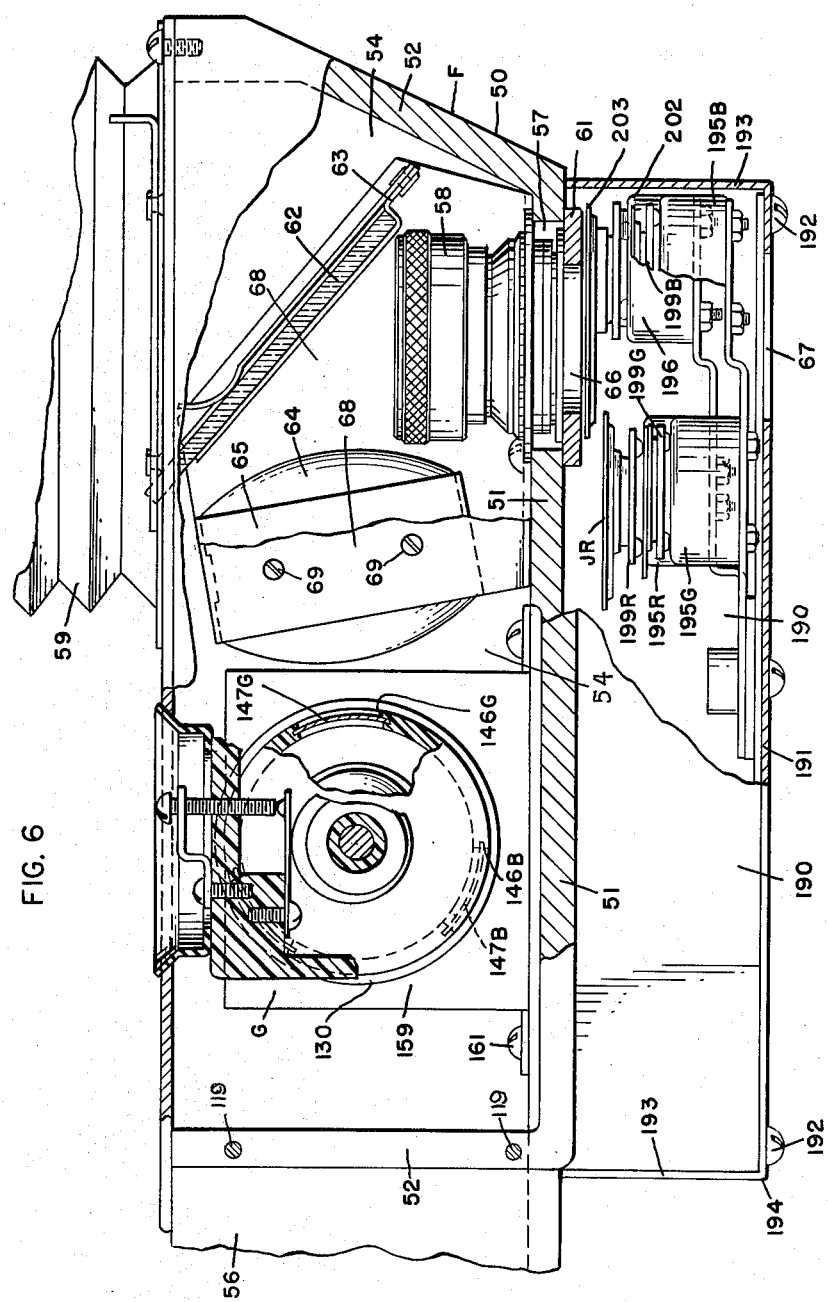

Aug. 13, 1963  R. A. CLAPP  3,100,419
PHOTOGRAPHIC PRINTER
Filed Jan. 30, 1959  9 Sheets-Sheet 6

INVENTOR
ROY A. CLAPP
Caswell & Lagaard
ATTORNEYS

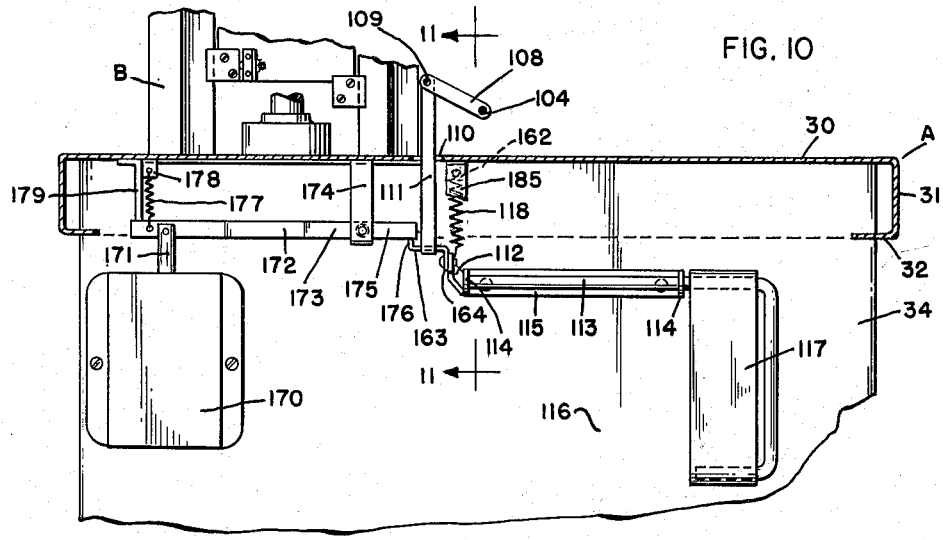
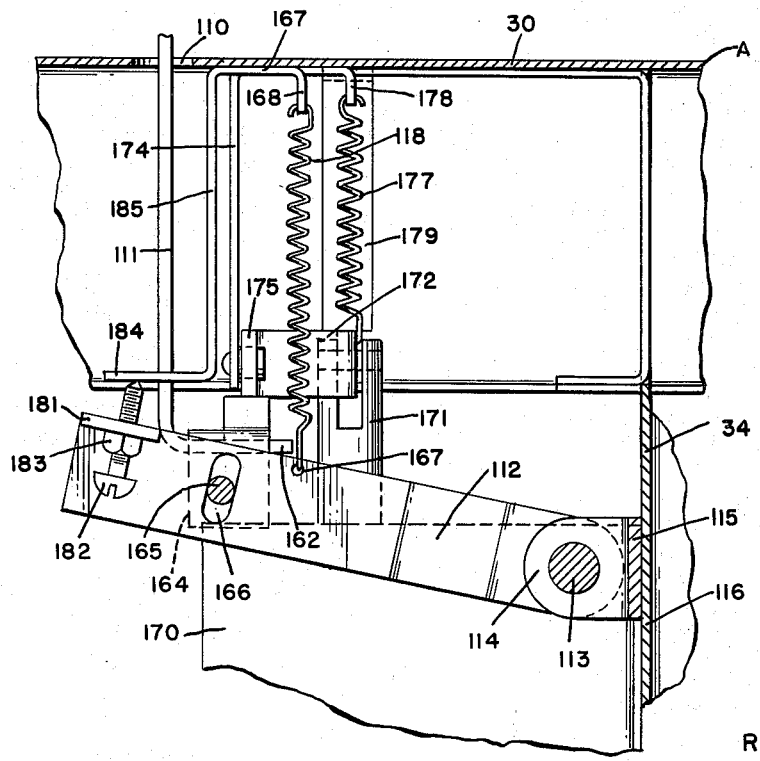

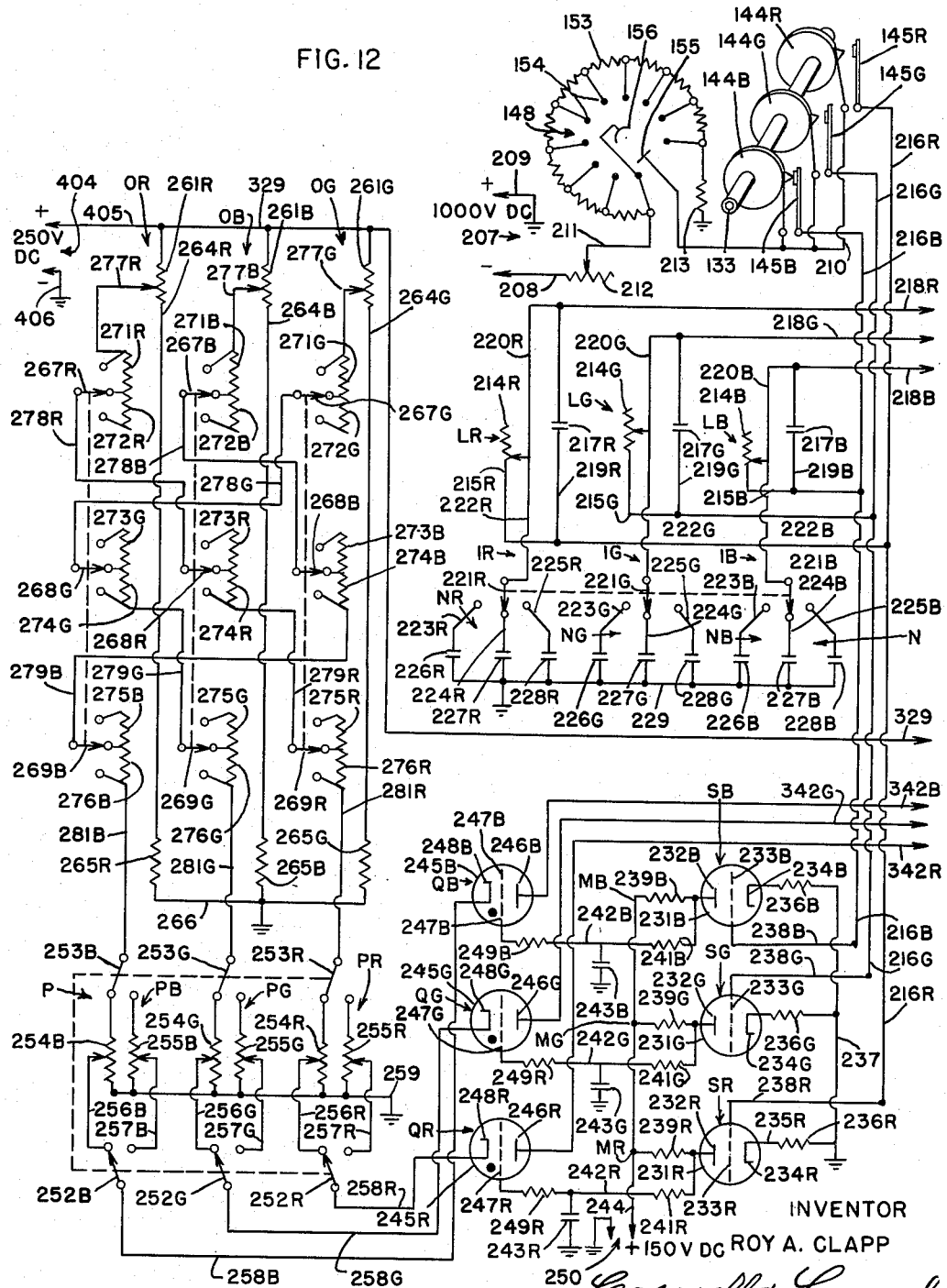

Aug. 13, 1963  R. A. CLAPP  3,100,419
PHOTOGRAPHIC PRINTER
Filed Jan. 30, 1959  9 Sheets-Sheet 9

INVENTOR
ROY A. CLAPP
Caswell & Lagaard
ATTORNEYS

United States Patent Office 3,100,419
Patented Aug. 13, 1963

3,100,419
PHOTOGRAPHIC PRINTER
Roy A. Clapp, Minneapolis, Minn., assignor to Pako Corporation, Minneapolis, Minn., a corporation of Delaware
Filed Jan. 30, 1959, Ser. No. 790,226
11 Claims. (Cl. 88—24)

The herein disclosed invention relates to photographic printing apparatus and particularly to photographic printers for multiple sensitized photographic material and has for an object to provide a printer for producing usable prints from a variety of image bearing supports of varying quality.

Another object of the invention resides in providing a printer in which the desired results are produced more or less automatically and without requiring extreme operator's skill.

An object of the invention resides in providing means for automatically controlling the density and color balance of the prints from the majority of the negatives.

A still further object of the invention resides in providing separate calibrated controls for each color for compensating for emulsion variations which vary from batch to batch of the photographic material and without affecting the results produced by other controls.

Another object of the invention resides in providing manual controls for overriding the automatic controls to permit the operator to print from negatives known as subject failure without affecting the density of the print.

An object of the invention resides in providing a manual control overriding the automatic density control to permit the operator to print from negatives having abnormal tonal distribution.

Another object of the invention resides in providing means for constantly reading light samples during the actual exposure period to correct for line voltage fluctuation.

A still further object of the invention resides in providing apparatus for light sampling utilizing a single photo-electric cell.

An object of the invention resides in providing interpolating means for procuring an infinite number of exposure time increments.

Another object of the invention resides in providing timing controls which read the entire image assigning equal weight to all parts of said image.

Other objects of the invention reside in the novel combination and arrangement of parts and in the details of construction hereinafter illustrated and/or described.

In the drawings:

FIG. 5 is a longitudinal elevational sectional view taken on line 5—5 of FIG. 4.

FIG. 6 is a transverse elevational sectional view taken on line 6—6 of FIG. 5.

FIG. 10 is a transverse elevational sectional view taken on line 10—10 of FIG. 2.

FIG. 11 is a fragmentary elevational sectional view taken on line 11—11 of FIG. 10 and drawn to a greater scale.

FIG. 12 is a wiring diagram of a portion of the electrical system of the invention.

FIG. 15 is a diagram showing the graph of the signal pulses for one color derived from the photo-electric cell.

FIG. 16 is a diagram showing the graph of the resulting voltage applied to the buffer circuit.

FIG. 17 is a diagram showing the graphs of the resulting voltages derived from the buffer circuit and delivered to the trigger circuit.

Figure 1:
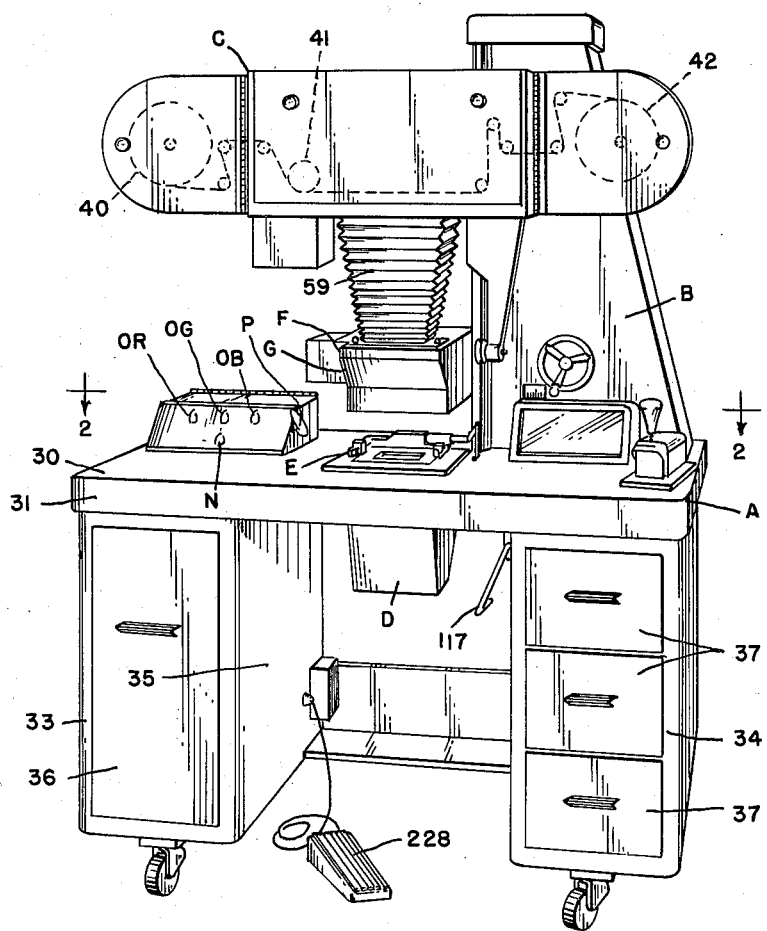
FIG. 1 is a perspective view of photographic printing apparatus illustrating an embodiment of the invention.

While some features of the invention may be used in the printing of black and white photographic material, the invention is particularly applicable to photographic printing paper having three emulsions sensitive to red, green, and blue light. To simplify the description of the invention and to prevent needless repetition, all parts and components pertaining to the printing of the red emulsion will be described and given reference numerals with the letter R added. The parts and components corresponding thereto and pertaining to the green and blue emulsions will not be again described but will be given the same reference numbers as those applied to the red parts and components and to which will be appropriately added the letters G and B.

The photographic printing apparatus of the invention is mounted on a table A which supports the various sections of the same. Extending upwardly from said table at one end thereof is a column B which supports a paper section C and an optical section F. These two sections are movable in an up and down direction to focus the image on the paper. Mounted on the table at the intermediate portion of the same is an illuminating section D by means of which light may be passed through a negative carried by a negative holder E disposed at the upper surface of the table A. A light valuating section G is used in conjunction with the optical section to sample the light and to alter the color of the printing light in accordance with the requirement for the particular negative being printed. The sample light is directed to a distributor H which distributes samples of the primary colors to three different channels. In these channels, timers IR, IB and IG are employed, which control the photographic exposure of the respective color emulsions on the photographic material. Printing filters JR, JB and JG are used which are operated by the timers and which alter the color of the printing light to counterbalance the color deficiencies of the negatives. All of the functions of the printer are controlled by a programming section K consisting generally of electrical and electronic components.

Figure 13:
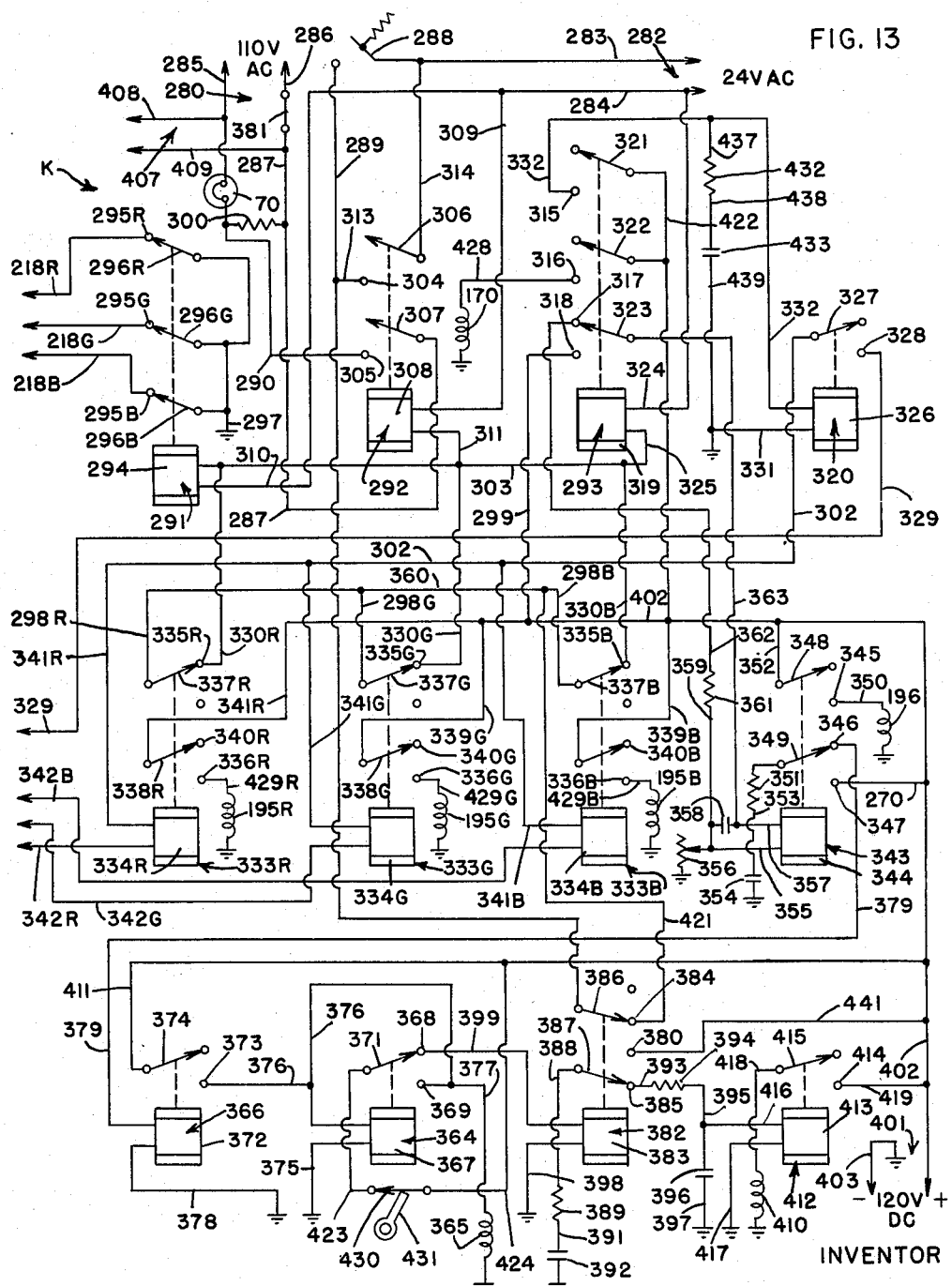
FIG. 13 is a wiring diagram of the remainder of the electrical system of the invention.

The electrical section of the invention receives signal pulses from the distributor H and feeds it to compensating circuits LR, LG and LB. The energy from these circuits is fed to the timers IR, IG and IB which include interpolating circuits MR, MG and MB and trigger circuits QR, QG and QB which operate the printing filters JR, JG and JB to terminate the printing of each emulsion of the photographic material. The operation of the printing filters JR, JG and JB is further controlled by manually operated density modifying means N including density modifying circuits NR, NG and NB, color modifying circuits OR, OG and OB and light compensating means P including light compensating circuits PR, PG and PB. All these circuits and the various functions of the machine are controlled by the programming section K. The programming section of the invention is illustrated in FIG. 13 while the other electrical sections of the invention are illustrated in FIG. 12.

The various sections of the invention will now be described in detail.

The Table

Table A, best shown in FIGS. 1, 2, 3 and 10, consists of a table top 30 which is constructed of sheet metal and which has depending flanges 31 at the marginal portions of the same. Lips 32 extend inwardly from the lower edges of the flanges 31 and form a box-like structure for the top. The top 30 rests upon two standards 33 and 34 spaced from one another to form a knee space 35 therebetween. Standard 33 contains the power supplies for the various electrical and electronic components of the invention and has a door 36 which may be opened to expose the same. The standard 34 has a number of drawers 37 in which various sizes of negative holders may be stored and in which other equipment used in operating the machine may be placed.

The Column

Figure 2:
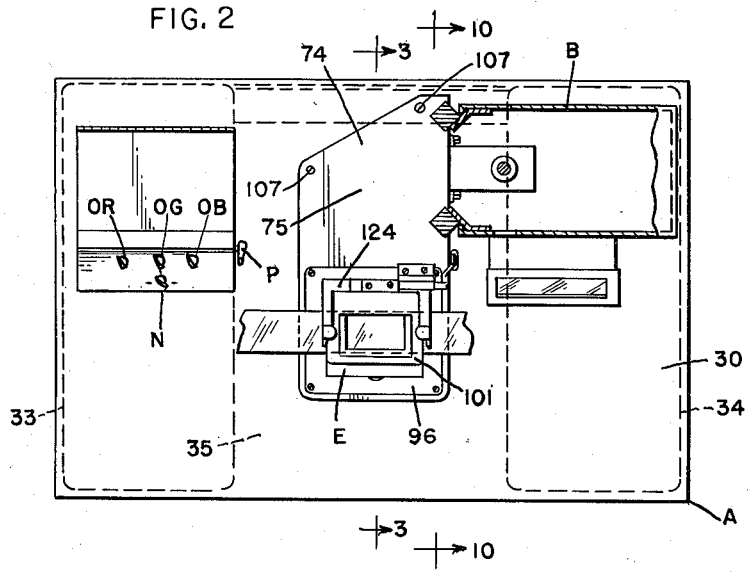
FIG. 2 is a plan sectional view taken on line 2—2 of FIG. 1.

Column B, shown in FIGS. 1 and 2, may be of any desired construction and supports the paper section C and the optical section D for relative movement with respect to each other and with respect to the film holder F. Suitable mechanism is employed whereby these parts may be adjusted to vary the size of the print and to focus the image from the negative on the paper. Such construction forming no feature of the instant invention, has not been shown in detail and will not be described. It will readily be apparent, however, that the invention may be used in any type of focusing and elevating mechanism now in common use.

The Paper Section

The paper section C of the invention, shown only in FIG. 1, contains a magazine 40 for storing unprinted paper in the roll, a feed mechanism 41 which directs the paper in position to receive the image transmitted to it by the optical system, and a take-up mechanism 42 which rolls up the printed paper and stores the same for subsequent development. Again, this particular construction forms no feature of the instant invention and has not been illustrated in detail nor will it be further described. However, any paper feeding mechanism such as is now well known in the art may be used for the purpose.

The Illuminating Section

Figure 3:
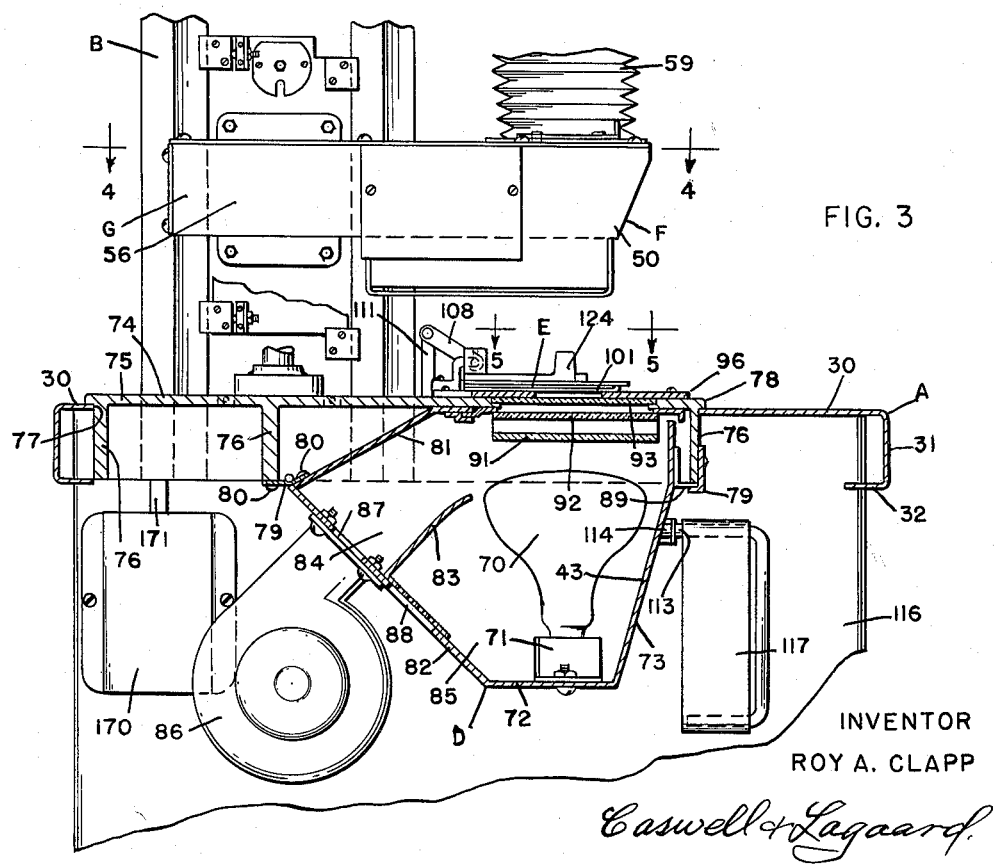
FIG. 3 is a fragmentary elevational sectional view taken on line 3—3 of FIG. 2.
Figure 8:
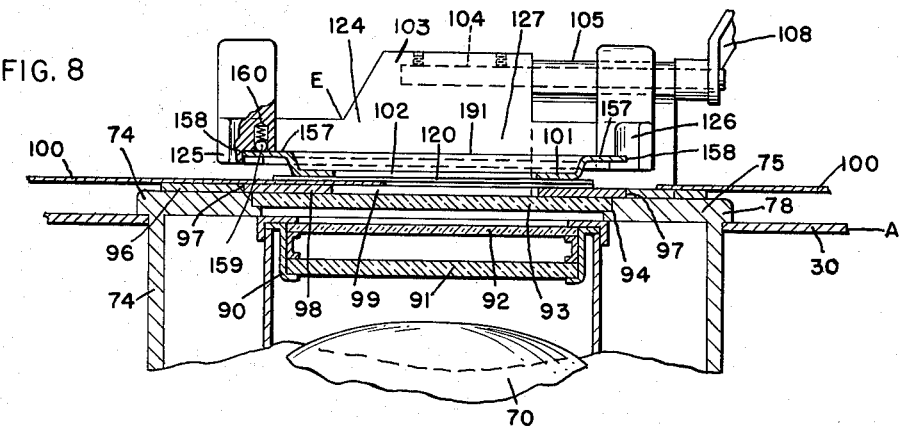
FIG. 8 is a fragmentary elevational sectional view taken on line 8—8 of FIG. 7.

Light is procured for the purpose of printing from a lamp 70 forming part of the illuminating section D, best shown in FIGS. 3 and 8. This lamp is mounted in a socket 71 which is attached to the bottom 72 of a case 73. The case 73 is attached to an insert 74 constructed in the form of a casting. This insert has a top 75 and flanges 76 depending therefrom. The insert 74 extends through an opening 77 in the table top 30 and the marginal portion 78 of the top 75 rests on the table top 30 and supports the insert 74. The case 73 is attached to the flanges 76 by means of a hinge 79 which is secured to said case and to said flanges through screws 80. The front of the case 73 has a front wall 43 and to which is secured a latch lug 89. A latch 79 pivoted to the flange 76 of insert 74 engages said lug and holds the case in position. The case 73 has an upper wall 81 extending up to the top 75 and a rear wall 82 extending angularly from the bottom 72. In the interior of the case 73 is provided a baffle 83 which extends partially into said case and divides the same into two compartments 84 and 85. A motor driven blower 86 is attached to the rear wall 82 and directs air through an opening 87 in said wall and into the compartment 84. Air entering this compartment flows upwardly and about the lamp 70 and leaves the compartment 85 through a screened opening 88 in the wall 82 immediately below the baffle 83. By means of this construction, the lamp 70 may be operated for an extended period at full brilliancy and kept sufficiently cool.

Within the case 73 and above the lamp 70 is mounted a filter holder 90 which is attached to the upper portion of case 73 below the top 75 of insert 74. A heat absorbing filter 91 is mounted in the lower portion of this holder and is next to the lamp 70. Above this filter is disposed a light equalizing plate 92 and above this plate is disposed a light diffusing plate 93. The top 75 has a rabbeted opening 94 formed in the same and in which is received the plate 93.

The Negative Holder

Figure 7:
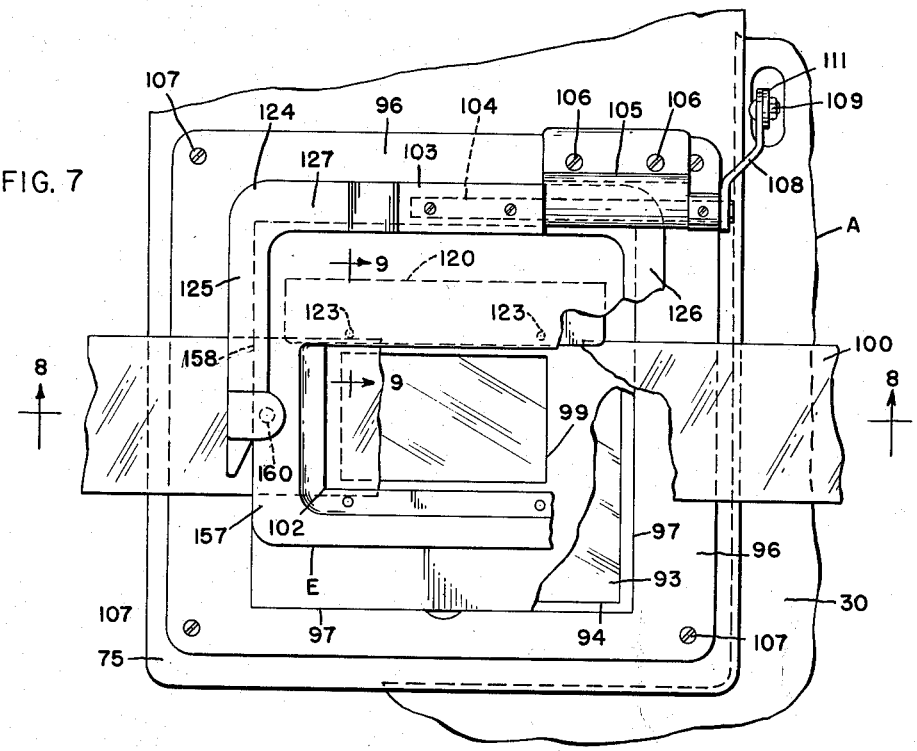
FIG. 7 is a plan view of the negative holder of the invention and drawn to the same scale as FIG. 4.

Above the plate 93 and attached to the top 75 is the negative or film holder E which is shown in detail in FIGS. 7 and 8. This negative holder consists of a frame 96 formed with an aperture 97 to receive a printing mask 98. This frame is secured to the top 75 by means of screws 107, FIG. 7. The mask 98 has an opening 99 in the same and through which the light emerges. The negative, one of which is indicated by the reference numeral 100 in the drawings, rests upon the mask 98 and upon the frame 96. For holding the negative in position upon said mask, a clamp plate 101 is employed which has an opening 102 through the same of dimensions substantially equal to the opening 99 in the mask 98 and superimposing the same. For supporting said clamp plate, a U-shaped frame 124 is employed which has spaced legs 125 and 126 with a connecting portion 127 therebetween. This frame overlies the mask 98 and straddles the opening 99 in the same. The marginal portion 157 of the plate 101 which is offset upwardly from the central portion of the plate, is adapted to be inserted into slots 158 in the legs 125 and 126 and in the connecting portion 127 of frame 124. Spring pressed balls 159 slidably movable in bores 160 in the legs 125 and 126 hold the plates 101 detachably mounted in the frame 124. The connecting portion 127 has a lug 103 extending upwardly from the same and which has attached to it a stub shaft 104. Shaft 104 is journaled in a bearing 105 secured to the frame 96 by means of screws 106.

The frame 124 is moved in an up and down direction by means of the following construction: An arm 108 is secured to the end of the stub shaft 104 and extends rearwardly thereof. This arm has pivoted to it by means of a bolt 109, a link 111, which extends through a slot 110 in the table top 30, FIGS. 10 and 11. Link 111 is in turn pivoted to an arm 112 extending outwardly from a shaft 113. This shaft is rotatably mounted in lugs 114 which project outwardly from a bracket 115. Bracket 115 is secured to the inner wall 116 of standard 34. Connection between the link 111 and arm 112 is effected in the following manner: Link 111 has an outwardly bent flange 162 and to which is welded a plate 163. This plate has a depending flange 164 which has attached to it a headed pin 165. Pin 165 passes through a transverse slot 166 in the lever 112. A tension coil spring 118 is attached at one end to the arm 112 and at its other end to a lug 168 formed on a bracket 167 secured to the underside of the table top 30. This spring urges arm 112 upwardly. The shaft 113 has a lever 117 depending therefrom and which extends into the knee space 35 of the table A. The spring 118 acting between the flange 162 on the link 111 and the lug 168 serves to urge the clamp plate 101 toward film clamping position. When the operator's knee is moved laterally against the lever 117, the film holder is raised and the film can be moved and adjusted as desired. When the lever 117 is released, the film is held in a position parallel to but spaced from the mask 98 to permit sliding of the film along the same.

Final clamping of the film in position is procured by means of a solenoid 170, FIG. 10, which has a core 171 adapted to be drawn into the solenoid proper when the solenoid is energized. This core has pivoted to it one arm 172 of a lever 173. Lever 173 is pivoted to a hanger 174 attached to and depending from the underside of the top 30 of table A. The other arm 175 of the lever 173 overlies and engages a lug 176 on the plate 163. A tension coil spring 177 is connected to the arm 172 of lever 173 and to a lug 178 attached to the underside of table top 30. This spring moves in a direction to urge the core 171 out of the solenoid proper and to hold the link 111 in a position in which the clamp plate 101 is spaced from the mask 98. A stop 179 limits the movement of lever 173.

The end of arm 112 has a lug 181 extending outwardly therefrom. This lug is tapped to receive an adjusting screw 182. A lock nut 183 screwed on said screw and engaging lug 181 holds the screw in adjusted position. Screw 182 engages a stop 184 formed on a hanger 185 depending from the bracket 167 and limits movement of the arm 112 to a position in which pin 165 can move in slot 166 free from said arm to effect final clamping of the film by the solenoid 170.

Figure 9:
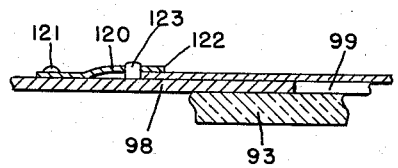
FIG. 9 is a fragmentary elevational sectional detail view taken on line 9—9 of FIG. 7.

The film is guided for movement over the mask 98 by means of a resilient guide 120, FIG. 9. This guide is attached to the mask 98 by means of rivets 121 and the marginal portion 122 of the same engages the mask proper. A number of stops 123 are attached to the mask 98 and project through the guide 120. The resiliency of the guide 120 permits of inserting the film between said guide and mask and yieldingly holds it in position against the stops 123 which center the same over the printing opening 99.

The Optical Section

The optical section F of the invention comprises a case 50, best shown in FIG. 6, which is in the form of a casting and which is constructed with a bottom 51 and a lateral wall structure 52. This case has a bracket 56 extending outwardly therefrom and which is mounted on the column B for vertical sliding movement.

The bottom 51 of the case 50 has an opening 57 in the same and in which is positioned a lens system 58. This lens system receives the image from the film and directs it upwardly through a bellows 59 extending between the case 50 and the paper section C. This lens system is located in the forward portion of the compartment 54 within said case and is centered with respect to the bellows 59. The lens system 58 is supported on a collar 61 attached to the underside of the bottom 52 of case 50 and which has an opening 66 in the same coaxially disposed with the axis of the lens system 58. Lens systems which are now in common use in color printing and enlarging machines, may be used for the purpose, and the same forming no particular feature of the instant invention has not been shown in detail.

The Light Evaluation Section

Figure 4:
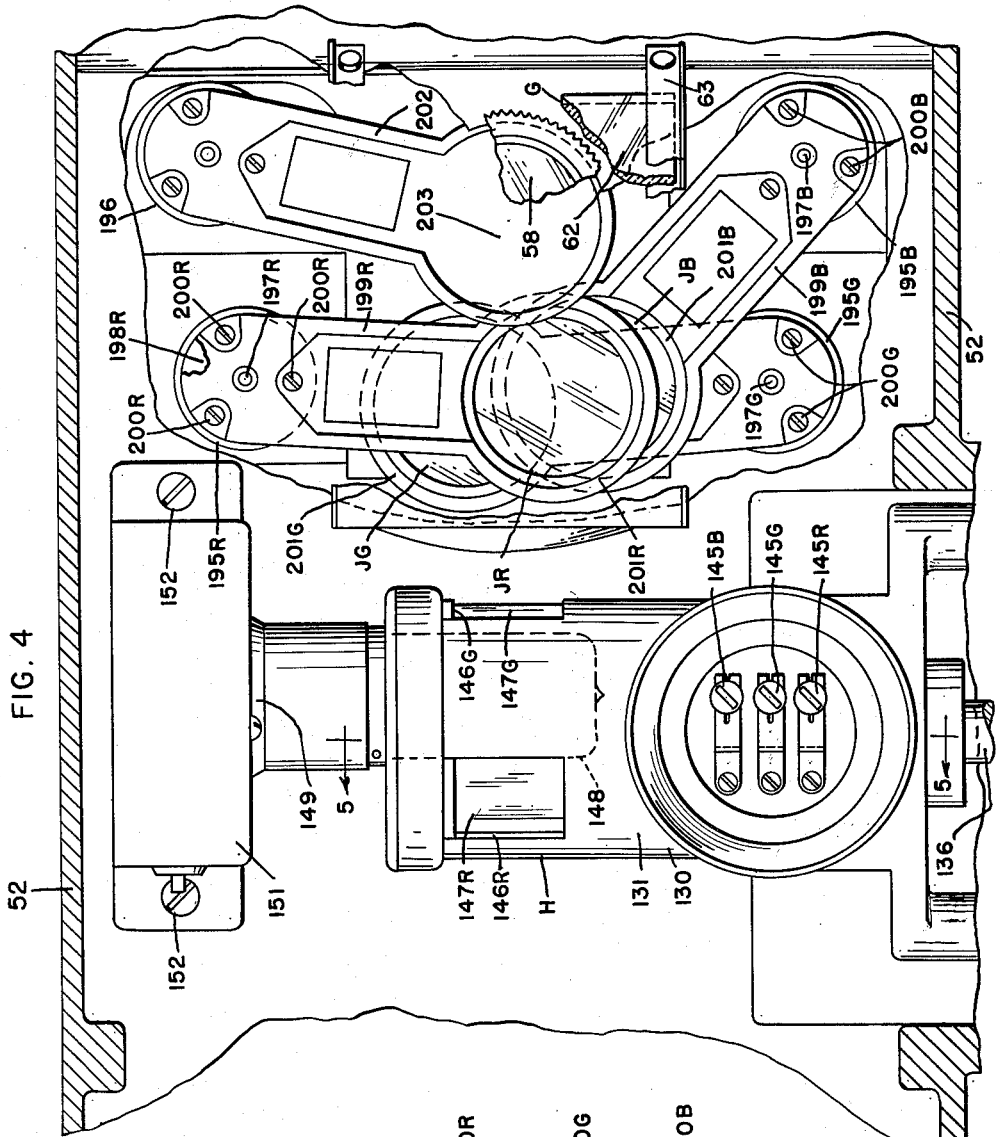
FIG. 4 is a fragmentary plan sectional view taken on line 4—4 of FIG. 3 and drawn to a greater scale.

The light evaluating section G is best shown in FIGS. 4, 5 and 6. The lens system 58 is disposed at the lowermost portion of the compartment 54. Immediately above this lens system is a beam splitter 62. This beam splitter consists of a glass plate constructed of optical glass which, when arranged on an angle as shown, has the property of passing the greater portion of the light striking the same through it and reflecting a lesser portion. The transmitted light passes through the bellows 59 and to the printing paper where the exposure of the same takes place. The beam splitter 62 is mounted in a holder 63 which is attached to plates 68 mounted on the bottom 51 of case 50. The light reflected by the beam splitter 62 passes through a condenser lens system 64 which is supported in a holder 65 also carried by the plates 68 and attached thereto by screws 69. The light evaluating section G further comprises electrical circuits which will be subsequently more fully described.

The Distributor

The light passing through the lens system 64 is directed to the distributor H which is best shown in FIGS. 4, 5 and 6. This distributor comprises a cup 130 shown in detail in FIG. 5. This cup has a cylindrical wall 131 and an end wall 132 which has issuing from the center of the same a boss 133. A shaft 134 is attached to the boss 133 and is mounted for rotation in bearings 135 carried by a bracket 128 which has posts 143 extending outwardly therefrom and secured to a plate 141 by means of screws 129. Plate 141 is attached to the wall structure 52 by means of screws 119. The shaft 134 is provided at its outer end with a sheave 136 which is driven through a belt 137 from a sheave 138 mounted on the armature shaft 139 of a motor 140. Motor 140 is attached to the supporting plate 141 by means of screws 142.

Mounted on the boss 133 of cup 130 are three cams 144R, 144G and 144B which are adapted to actuate three switches 145R, 145G and 145B. Cams 144R, 144G and 144B are arranged so that the same close the various switches 145R, 145G and 145B at positions of the cup 130 one hundred and twenty degrees apart. These switches function in the electrical circuits of the evaluating device as will be presently described. The cylindrical wall 131 of the cup 130 has formed in it three windows 146R, 146G and 146B. In these windows are disposed analyzing filters 147R, 147G and 147B. These filters pass red, green and blue rays respectively and each filter rejects the rays of the other filters. The optical lens system 64 is arranged so that the light passing through the same is successively directed to the windows 146R, 146G and 146B and passes through the filters mounted therein. Within the interior of the cup 130 is disposed a photoelectric cell 148, FIG. 4, which is mounted in a socket 149. This socket is attached to bracket 151 which in turn is secured by means of screws 152 to the bottom 51 of the case 50. The photo-electric cell 148 is of the type known as a number 931A photo-multiplier tube. This tube includes a voltage divider 153 which is connected to dynodes 154 and further includes a plate 155 and a cathode 156.

The Printing Filters

Printing of the separate emulsions on the multiple sensitized photographic material is accomplished by using as the light source 70 a lamp emitting light of all of the wave lengths necessary to print the particular colors. After an opaque shutter closing the passage of light through the lens system F has been opened, the initial phase of the printing is commenced by a white light exposure. The evaluating section acts cooperatively with the timer circuitry to determine the length of this basic exposure in accordance with the density and color balance of the negative, which is then terminated by altering the color of the light by inserting an optical filter or filters which pass light of the color required to correct the faults which would result in the print from the use of normal white light alone. When the modifying color exposure is completed, the last phase of the photographic exposure is ended by closing the shutter to block off all light from reaching the sensitized material. It will not always happen that when the white light exposure phase is satisfied that a single color of modifying exposure will exactly correct for the negative deficiencies. While the emulsion layers are individually sensitized to only red, green and blue, I prefer to alter the color of the modifying exposure by inserting filters of cyan, magenta or yellow, since these filters in various combination will produce the primary colors, red, green, or blue, and further that the order and duration of the insertion permit adding different quantities of each primary color.

An important feature of the present invention is that I use filters that are not of the full cut-off type, but which instead pass definite amounts of white light admixed with colored light. This provides two important advantages.

Due to the imperfections present in filter dyes, full cut-off types introduce serious amounts of neutral density which serve only to reduce the light intensity and prolong the time of the modifying exposure. Further, filters which cut off all light of one primary will serve to over-correct negatives of the subject failure type. Suitable exposing filters would be composed of several layers of Kodak Wratten filters of CC type of cyan, magenta and yellow to produce a density of about 1.20 to 1.50 in each color.

Depending from the bottom 51 of case 50 are spaced sidewalls 190 as shown in FIG. 5. These sidewalls have attached to them a bottom 191 which is secured to the sidewalls by means of screws 192. The bottom 191 has flanges 193 formed at the ends of the same and constituting in conjunction with the sidewalls 190 a housing disposed below the case 50. This housing is indicated in its entirety by the reference numeral 194. Disposed within the housing 194 and mounted on the bottom 191 are four solenoids 195R, 195G and 195B and an additional solenoid 196. The solenoid 195R has a shaft 197R which has attached to it a flange 198R. An arm 199R is secured to the flange 198R by means of screws 200R. This arm carries at the outermost portion of the same a filter holder 201R in which is mounted the filter JR. The filter JR is of cyan color. Similarly, filter JG is of magenta color, while the filter JB is of yellow color. The solenoid 196 has mounted on it an arm 202 which carries an opaque shutter 203. The various arms 199R, 199G and 199B and 202 are of such length that the various filters and the shutter may be moved into a position to register with the opening 66 and with another opening 67 in the bottom 191 of housing 194. Also, the various arms, filters and shutter are in different planes so that the said filters and shutter may be all brought into register with opening 66 without interference.

The Timers

The timer IR includes the compensating circuit LR, the trigger circuit QR, the interpolating circuit MR, the density modifying circuit NR, the color modifying circuit OR and the light compensating circuit PR. These circuits will now be described in detail.

One element of each of the switches 145R, 145G and 145B are connected to a common conductor 210 which in turn is connected to the plate 155 of tube 148. Tube 148 is energized by a power line 207 which is connected to a source of direct current of approximately 1000 volts. This line comprises a conductor 208 which is connected to the negative side of the power source and a conductor 209 which is connected to the positive side and which is grounded. The cathode 156 of this tube is connected to one end of the voltage divider 153 and to a conductor 211. This conductor in turn is connected to a variable resistor 212 which in turn is connected to the conductor 208. The other end of the voltage divider 153 is connected to a resistor 213 which is grounded.

The Compensating Circuits

The compensating circuit LR includes a variable resistor 214R which is connected to a conductor 215R and which in turn is connected to another conductor 216R. This latter conductor is connected to the other element of the switch 145R. A condenser 217R is connected to the conductor 215R by means of a conductor 219R and to another conductor 218R which in turn is connected to the programming section K of the invention as will be presently described. The movable member of the resistor 214R is connected by means of a conductor 220R to the conductor 218R.

The Density Modifying Circuits

The density modifying circuit NR includes a single pole three-position switch 221R, the movable contact of which is connected by means of a conductor 222R to the conductor 220R. The fixed contacts of this switch are connected by means of conductors 223R, 224R and 225R to three condensers 226R, 227R and 228R. These condensers are all connected to a common conductor 229 which is grounded. All of the switches 221R, 221G and 221B are ganged and operate in unison.

The Buffer Circuits

The buffer circuit SR includes a tube 231R which may be a triode and which has a plate 232R, a grid 233R and a cathode 234R. The cathode 234R is connected by means of a conductor 235R to a resistor 236R and which is connected to a grounded conductor 237. The grid 233R of this tube is connected by means of a conductor 238R to the conductor 216R.

The Interpolating Circuits

The interpolating circuit MR includes two fixed resistors 239R and 241R which are both connected at one end to the plate 232R of tube 231R. The resistor 241R is connected by means of a conductor 242R to a condensor 243R which in turn is grounded. The resistor 239R is connected by means of a conductor 244 to the positive side of a line 250 connected to a source of direct current of about 150 volts.

The Trigger Circuits

The trigger circuit QR comprises a gas filled thyratron tube 245R having a plate 246R, a grid 247R and a cathode 248R. A grid resistor 249R is connected to the conductor 242R and to condenser 243R and also to the grid 247R.

The Light Compensating Circuits

The light compensating circuit PR is used for selectively printing prints from negatives exposed either by flash illumination or outdoor illumination and comprises two two-position single pole manually controlled switches 252R and 253R operating in conjunction with two basic bias potentiometers 254R and 255R. One of the fixed contacts of switch 252R is connected to the movable contact of potentiometer 254R by means of a conductor 256R. The other fixed contact of switch 252R is connected by means of a conductor 257R to the movable contact of potentiometer 255R. The movable contact of switch 252R is connected by means of a conductor 258R to the cathode 248R of tube 245R. One end of the resistor of potentiometer 254R is connected to one of the fixed contacts of switch 253R while the corresponding end of the resistor of potentiometer 255R is connected to the other fixed contact of switch 253R. The other ends of the resistors of potentiometers 254R and 255R are connected to a common conductor 259 which is grounded.

The Color Modifying Circuits

The color modifying circuits OR, OG and OB permit of varying the intensity of any particular color without changing the overall density of the print. Power for operating these circuits is derived from a power line 404 connected to a source of direct current of about 250 volts. This line comprises a conductor 405 which is connected to the positive side of the source of power and a conductor 406 which is connected to the negative side and which is grounded. The circuits OR, OG and OB include emulsion factor potentiometers 261R, 261B and 261G. One end of each of these potentiometers is connected to a conductor 329 which in turn is connected to the positive side 405 of the line 404. The other ends of these potentiometers are connected through conductors 264R, 264B and 264G to emulsion factor resistors 265R, 265B and 265G. These resistors are all grounded through a conductor 266 thus forming an emulsion factor voltage divider. The color modifying circuits utilize three single pole three-position color modifying switches for each color designated by the numerals 267R, 267B, 267G, 268G, 268R, 268B, 269B, 269G and 269R. The switches 267R, 268G and 269B are ganged and move in unison. Similarly, the switches 267B, 268R and 269G are ganged and also the switches 267G, 268B and 269R are ganged. The switches 267R, 268R and 269R have connected to the fixed contacts of the same resistors 271R, 272R, 273R, 274R, 275R and 276R and forming with the pair of said resistors associated with each switch a variable resistance. Similar resistors are connected to the other switches. The resistor 271R is connected through a conductor 277R to the movable contact of the potentiometer 261R. The movable contact of the switch 267R is connected by a conductor 278R to the movable contact of switch 268R. The resistor 274R is connected by a conductor 279R to the movable contact of the switch 269R. The resistor 276R is connected by a conductor 281R to the movable contact of the switch 253R. The foregoing forms color modifying networks, one for each color. When any of the three gangs of switches are moved from one position to another to increase or decrease the resistance in one of the color circuits, the resistance in each of the other color circuits is decreased or increased by an amount equal to one-half of the increase or decrease in the denoted circuit, thus maintaining the density the same. Thus each color modifying network in series with one of the basic bias potentiometers forms a color modifying voltage divider which provides variable bias voltages for the trigger circuits controlling the firing points of all of the trigger tubes SR, SB and SG which depend upon the setting of any of the color modifying switches together with the basic bias potentiometer of a particular tube and the setting of the emulsion factor potentiometer for the same tube.

*The Programming Section*

The programming section K of the invention is shown in its entirety in FIG. 13. Power for operating the lamp 70 is derived from a power line 280 connected to a source of alternating current of approximately 110 volts. This line comprises conductors 285 and 286. Conductor 285 is connected to the lamp 70 while conductor 286 is connected to the main switch 281 of the invention. The lamp 70 is further connected to a conductor 290 while the switch 381 is further connected to a conductor 287. A resistor 300 is connected across the conductors 287 and 290. In addition to the power line 280, another power line 282 is employed, which is connected to a source of alternating current of approximately 24 volts. This line comprises conductors 283 and 284. Conductor 283 is connected to a spring returned foot switch 288 which in turn is connected to a conductor 289. In addition, a third power line 401 is employed which is connected to a source of direct current of approximately 120 volts. This power line comprises a conductor 402 which is connected to the positive side of the source of power and a conductor 403 which is connected to the negative side of the source of power and which is grounded. All of the sources of power for the lines 207, 280, 282, 401 and 404 as well as a source of power for energizing the filaments of the various tubes (not shown) consist of power supplies which are directly connected to and energized by an alternating current power line 407. This power line comprises conductors 408 and 409 which are connected to the conductors 285 and 287 of the power line 280.

Energized by the power line 282 is a condenser shorting relay 291, a lock-in relay 292, and a negative holding relay 293. The condenser shorting relay includes a coil 294, fixed contacts 295R, 295G and 295B, and movable contacts 296R, 296G and 296B. The movable contacts 296R, 296G and 296B are all connected to a conductor 297 which is grounded. Conductors 218R, 218G and 218B are respectively connected to the fixed contacts 295R, 295G and 295B of relay 291. The coil 294 is connected to a conductor 310 which is connected to conductor 284 of line 282 and to a conductor 303, the further connection of which will be presently described. The contacts of the relay 291 are normally closed and connect the condensers 217R, 217G and 217B to ground. When this relay is energized, the said condensers are disconnected from ground and may accept charges from the photo-electric tube 148.

The relay 292 consists of two fixed contacts 304 and 305, two movable contacts 306 and 307 and a coil 308. The coil 308 is connected to the conductor 284 by means of a conductor 309. This coil is further connected by means of a conductor 311 to the conductor 303. Contact 305 is directly connected to the conductor 290 while contact 304 is connected by means of a conductor 313 to the conductor 289. Movable contact 306 is connected by a conductor 314 to conductor 283 and movable contact 307 is connected to the conductor 287 of the line 280. The contacts of relay 292 are normally open and when the relay is actuated contacts 304 and 306 paralleling switch 288 serve as a lock-in device maintaining the circuit closed by said switch until released by other means. At the same time, relay 292 on closing contacts 305 and 307 shorts out resistor 300 and causes the lamp 70 to burn at full brilliancy.

Relay 293 includes four fixed contacts 315, 316, 317 and 318, three movable contacts 321, 322 and 323 and a coil 319. The coil 319 of this relay is connected by means of a conductor 324 to conductor 284 of line 282 and by means of a conductor 325 to the conductor 303. Contact 316 is connected by means of a conductor 428 to one end of the negative holding solenoid 170, the other end of which is grounded. Contact 318 is connected to conductor 402 by means of a conductor 299 while contacts 321 and 322 are connected to conductor 402 by means of a conductor 422. The other contacts of this relay are associated with other relays and will be presently described.

Operating in conjunction with the relay 293 is a thyratron energizing relay 320 which has a movable contact 327, a single fixed contact 328 and a coil 326. The coil of this relay is connected by means of a conductor 331 to ground and by means of another conductor 332 to the contact 315 of relay 293. A resistor 432 is connected by means of a conductor 437 to conductor 332. This resistor is further connected by means of a conductor 438 to a condenser 433 which in turn is connected by means of a conductor 439 to ground. The fixed contact 328 is connected by means of a conductor 329 to the conductor 405 of the power line 404. The movable contact 327 of this relay is connected to a conductor 302.

In addition to the relays already referred to, three filter relays 333R, 333G and 333B are employed. These relays are similarly connected. Relay 333R has a coil 334R, three fixed contacts 335R, 336R and 340R, and two movable contacts 337R and 338R. One end of solenoid 195R is grounded while the other end is connected by means of a conductor 339R to the contact 336R. Movable contact 338R is connected by means of a conductor 341R to conductor 402 of power line 401. Fixed contact 335R of relay 333R is connected by means of conductor 330R to the conductor 303. Movable contact 337R is connected by means of a conductor 302R to a conductor 360. One end of the coil 334R of relay 333R is connected to a conductor 341R which in turn is connected to conductor 302. The other end of said coil is connected to a conductor 342R which in turn is connected to the plate 246R of the tube 245R.

For operating the shutter 203, a shutter relay 343 is employed which comprises a coil 344, three fixed contacts 345, 346 and 347 and two movable contacts 348 and 349. Solenoid 196 is connected at one end to ground and is connected at its other end by means of a conductor 350 to contact 345 of relay 343. Contact 347 of this relay is connected by means of a conductor 270 to conductor 402. Movable contact 348 is also connected to conductor 402 through a conductor 352, while movable contact 349 is connected to a resistor 351 which in turn is connected by means of a conductor 353 to a condenser 354 which is grounded. One end of the coil 344 of relay 343 is connected through a conductor 355 with a variable resistor 356 which is grounded. The other end of the coil 344 is connected by means of a conductor 357 to a condenser 358 which in turn is connected to a conductor 359. This conductor is connected to a resistor 361 and is also connected to the conductor 355. Resistor 361 is further connected by means of a conductor 362 to the fixed contact 317 of relay 293. Conductor 357 is also connected by means of a conductor 363 with the movable contact 323 of relay 293.

A paper feed relay 364 is used to progress the printing paper through the exposure portion of the paper section C. This relay operates a solenoid 365 which effects movement of the paper. A switch 430 is operated by an arm 431 which is actuated by movement of the paper and opens as soon as a suitable length of paper has been fed. The operation of relay 364 is initiated by a paper feed control relay 366. Relay 364 has a coil 367, two fixed contacts 368 and 369 and a movable contact 371. Relay 366 has a coil 372, a fixed contact 373 and a movable contact 374. One end of coil 367 is connected by means of a conductor 375 to ground. The other side of said coil is connected by means of a conductor 376 to the contact 373 of relay 366. Solenoid 365 is connected at one end by means of a conductor 377 to conductor 376 and the other end thereof is grounded. One end of coil 372 of relay 366 is grounded through a conductor 378. The other end of said coil is connected to a conductor 379 which is connected to contact 346 of relay 343. The movable contact 374 of relay 366 is connected by means of a conductor 411 to the conductor 402 of power line 401. Contact 371 of relay 364 is connected by means of a conductor 423 to switch 430 which in turn is connected by means of a conductor 424 to conductor 411.

An interlocking relay 382 is employed to prevent concurrent operation of the printing apparatus of the invention and the paper feeding section. This relay comprises a coil 383, three fixed contacts 384, 380 and 385 and two movable contacts 386 and 387. Contact 387 is connected by means of a conductor 388 to a resistor 389 which in turn is connected by means of a conductor 391 to a condenser 392. This condenser is grounded. Contact 385 is connected by means of a conductor 393 to a resistor 394 which in turn is connected by means of a conductor 395 to a condenser 396. This condenser is connected by means of a conductor 397 to ground. One end of the coil 383 of relay 283 is connected by means of a conductor 398 to ground. The other end of said coil is connected by means of a conductor 399 to the fixed contact 368 of relay 364. Contact 384 is connected by means of a conductor 421 to conductor 360. Contact 380 is connected by means of a conductor 441 to the conductor 402 of line 401. Contact 386 is directly connected to conductor 289.

The prints upon exposure are marked for cutting and with serial numbers by means of a marking device not shown in the drawings. This numbering and marking device is actuated by a solenoid 410 which is operated by a marking relay 412. This relay comprises a coil 413, a fixed contact 414 and a movable contact 415. Coil 413 is connected at one end by means of a conductor 416 to conductor 395 and at its other end by means of a conductor 417 to ground. Solenoid 410 is grounded at one end and connected by means of a conductor 418 to the movable contact 415 of relay 412. The fixed contact 414 of this relay is connected by means of a conductor 419 to conductor 402.

Applicant has found by actual use that the following types and values of components give satisfactory results:

RESISTORS

| | Ohms | Watts | | Ohms | Watts | | Ohms | Watts |
|---|---|---|---|---|---|---|---|---|
| 212 | 0.5M | ½ | 254B | 15K | 2 | 274B | 2.2K | ½ |
| 213 | 120K | ½ | 255R | 15K | 2 | 275R | 2.2K | ½ |
| 214R | 0.5M | ½ | 255G | 15K | 2 | 275G | 2.2K | ½ |
| 214G | 0.5M | ½ | 255B | 15K | 2 | 275B | 2.2K | ½ |
| 214B | 0.5M | ½ | 265R | 18K | 2 | 276R | 2.2K | ½ |
| 236R | 1K | ½ | 265G | 18K | 2 | 276G | 2.2K | ½ |
| 236G | 1K | ½ | 265B | 18K | 2 | 276B | 2.2K | ½ |
| 236B | 1K | ½ | 271R | 4.3K | ½ | 261R | 10K | 2 |
| 239R | 150K | ½ | 271G | 4.3K | ½ | 261G | 10K | 2 |
| 239G | 150K | ½ | 271B | 4.3K | ½ | 261B | 10K | 2 |
| 239B | 150K | ½ | 272R | 4.3K | ½ | 300 | 25 | 100 |
| 241R | 470K | ½ | 272G | 4.3K | ½ | 351 | 100 | 2 |
| 241G | 470K | ½ | 272B | 4.3K | ½ | 356 | 5K | 2 |
| 241B | 470K | ½ | 273R | 2.2K | ½ | 361 | 68 | 2 |
| 249R | 220K | ½ | 273G | 2.2K | ½ | 389 | 33 | 1 |
| 249G | 220K | ½ | 273B | 2.2K | ½ | 394 | 4.7K | 1 |
| 249B | 220K | ½ | 274R | 2.2K | ½ | 432 | 5.6K | 1 |
| 254R | 15K | 2 | 274G | 2.2K | ½ | 153 | 120K | ½ |
| 254G | 15K | 2 | | | | | | |

TUBES

| | Type | | Type | | Type |
|---|---|---|---|---|---|
| 148 | 931A | 231B | 6AF4-A | 245G | 2D21 |
| 231R | 6AF4-A | 245R | 2D21 | 245B | 2D21 |
| 231G | 6AF4-A | | | | |

CONDENSERS

| | µf. | Volt | Type |
|---|---|---|---|
| 228R | .375 | 200 | Paper. |
| 228G | .375 | 200 | Do. |
| 228B | .375 | 200 | Do. |
| 243R | .1 | 200 | Do. |
| 243G | .1 | 200 | Do. |
| 243B | .1 | 200 | Do. |
| 354 | 4 | 350 | Electrolytic. |
| 358 | 60 | 150 | Do. |
| 396 | 2 | 450 | Do. |
| 433 | 4 | 350 | Do. |
| 217R | .1 | 200 | Molded. |
| 217G | .1 | 200 | Do. |
| 217B | .1 | 200 | Do. |
| 226R | .14 | 200 | Paper. |
| 226G | .14 | 200 | Do. |
| 226B | .14 | 200 | Do. |
| 227R | .26 | 300 | Do. |
| 227G | .26 | 300 | Do. |
| 227B | .26 | 300 | Do. |
| 392 | 2 | 450 | Electrolytic. |

*Operation of the Printer*

The method of operation of the printer is as follows: When switch 381 is closed, the various power supplies are energized and all of the relays take the positions shown in the wiring diagram. The manually controlled switches have been shown in positions in which printing of average negatives is automatically procured. Upon closing switch 381 the relay 382 is energized. Lamp 70 is also turned on but due to the resistance 300 being in series with it the lamp lights dimly. When the operator closes the foot switch 288 momentarily, current from the 24 volt alternating current line 282 passes along conductor 283 through the closed contacts 386—384 of relay 382, along conductor 421 to common conductor 360, through normally closed contacts 337R—335R, 337G—335G, and 337B—335B of relays 333R, 333G and 333B to the common conductor 303 which is connected to the coils 294, 308 and 319 of relays 291, 292 and 293. The current then returns via conductors 310, 309 and 324 to conductor 284 of line 282. The completed circuit above energizes the coils of relays 291, 292 and 293 and the normally closed contacts 295R—296R, 295G—296G and 295B—296B open removing the shorts across condensers 226R, 227R, 228R, 226G, 227G, 228G, 226B, 227B and 228B. Normally open contacts 304—306 now close, locking in the 24 volt alternating current circuit 282 to maintain operation of said relays after foot switch 228 is reopened. Normally open contacts 305—307 simultaneously close and short out resistor 300 between conductors 290 and 287 so that the print lamp 70 is operated at full brilliance.

In relay 293, normally open contacts 315—321 close applying +120 volts direct current from common conductor 402 through conductors 422 to coil 326 of relay 320, and at the same time charging condenser 433 through resistor 432. Closing of normally open contacts 327—328 connects 250 volts from line 404 through conductor 329 to coils 334R, 334G and 334B of relays 333R, 333G and 333B. The other side of these coils are connected individually through conductors 342R, 342G and 342B to the plates 246R, 246G and 246B of the thyratron tubes 245R, 245G and 245B. These thyratron tubes do not immediately fire because their cathodes 248R, 248G and 248B are returned to a network of voltage dividers which will be described in detail later. This network holds the cathodes of the thyratron at potentials substantially above ground.

Returning to relay 293, now energized, normally open contacts 316—322 are closed supplying 120 volt direct current from line 402 through conductors 422 and 428 to the negative holder solenoid 170, which clamps and holds the negative flat in the focal plane of the printer. At the same time, contacts 318—323 of relay 293 close, thus applying 120 volt direct current from line 401 to to coil 344 of relay 343 through conductors 402, 299 and 363. This coil is, however, paralleled by condenser 358 and in series with potentiometer 356 to ground. Therefore, potentiometer 356 limits the flow of current which charges the condenser 358, and until this condenser is charged to a voltage above that which will operate the relay 343, said relay remains inoperative. By selecting the proper values of resistance and capacity the duration of this time delay can be controlled. Delay in operation of shutter 203 is to permit lamp 70 to come up to full brilliance.

As soon as relay 343 operates, the normally open contacts 348—345 close and connect +120 volts direct current to the shutter solenoid 196 which opens the shutter 203. Also, contacts 349—347 are closed applying a charging current to condenser 354, limited by resistor 351 to prevent excessive inrush of current.

The shutter 203 being open, light reaches photo cell 148, through the windows 146R, 146G and 146B in the filter cup 130. Photo cell 148 is supplied with −1000 volts from the line 207 through the conductor 208, variable resistor 212 and resistor 213. Variable resistor 212 and voltage divided 153 constitute a voltage control circuit so that the voltage across the photo cell and its elements can be varied by adjustment of the resistor 212. This permits controlling the sensitivity of the photo-electric cell 148. The tapped voltage divider 153 applies the required potential between the dynode stages of the photoelectric cell 148. Resistor 213 supplies a potential difference between the last dynode stage and ground. The signal appears at the anode or plate 155, connected by conductor 210 to the distributer switches 145R, 145G and 145B. These switches transfer the different signal pulses to the three separate color channels.

Each of the three color channels are identical in circuit, but permit of individual adjustment for color balancing. Thus, describing the red channel will serve to explain all channels. The signal passing through switch 145R which is now assumed to be momentarily closed while the red filter 147R is passing the light sample to the photo-electric tube, passes through potentiometer 214R, bridged by condenser 217R of the compensating circuit LR. Since the potentiometer 214R is cut out it has no effect. An explanation of the purpose of these elements will be subsequently made.

The signal is applied to the condenser 227R through the three-position switch 221R. This switch, manually controlled by the printer operator, permits selection of one of three condensers 226R, 227R and 228R of different values. At the same time, a corresponding condenser is selected in the green and blue channels, switches 221R, 221G and 221B being ganged. As the current from the photo-electric cell 148 charges condenser 227R the voltage drops at conductor 216R which is connected with the grid 233R of triode 231R. In other words, the electron flow from the photo-electric cell 148 drives the grid more negative. This reduces the current flow through the triode 231R. At the instant of initiation, the condenser 227R and connected grid 233R is at zero or ground potential. Under these conditions there is a considerable current flow through triode 231R which creates a large voltage drop across plate resistor 239R. The plate of triode 231R is then a few volts positive with respect to ground, and the plate being connected through resistors 241R and 249R to grid 247R of the thyratron 245R. The operating conditions being static, the voltage at said grid 247R is equal to the voltage at plate 232R, and much below that of the thyratron cathode 248R. But as the condenser 227R charges from the photo-electric cell current, the triode grid 365 becomes more negative and the consequent reduction in plate current in tube 231R causes the voltage on the plate 232R to rise in accord with grid signal. As will become evident the grid signal is in the form of a pulse having a duration equivalent to the time one of the windows in the filter cup is in front of the photo tube, and before any one channel receives another signal pulse the filter cup must make another revolution. FIG. 15 shows the oscillograph of these signal pulses indicated by the reference character a. In FIG. 16, the voltage change in the condenser 227R is indicated at b and as shown by the dotted extension lines, the voltage change takes place in a series of increments to produce a voltage graph something like a flight of steps. In FIG. 17, the voltage directly resulting from the application of the voltage of graph b to tube 231R is shown in graph c. If the trigger tube 245R was fired by this step-like voltage the time could only be controlled in increments of revolutions of the filter cup, because obviously if the N pulses did not quite operate the trigger element it would require N+1 pulses. For satisfactory prints, times must be controlled within a small percentage, say three percent of the theoretical time. A cup driven at 1800 r.p.m. (a satisfactory working speed for the mechanical switching involved) would produce 30 pulses per second. For a half second photographic exposure, also quite normal, the interval between pulses would be 1/15th of the exposure or about seven percent resolution as a limit. It would thus appear that this signal system is inherently defective. This would be true if a way had not been found to permit firing at fractional intervals, by providing means to interpolate the time intervals, so that the trigger means can be actuated at N+ a fraction of a pulse. To overcome the objection, the combination of resistor 241R and condenser 243R acting in cooperation with the buffer tube 231R and its plate resistor 239R is employed. The operation of these components is as follows: Consider the condition at the instant of the beginning of an exposure. Initially the tube 231R is conducting a heavy current through the resistor 239R due to low grid drive and thus a large voltage drop occurs in said resistor. When the first signal pulse occurs, the condenser 227R rapidly charges and applies a greater negative voltage to the grid of tube 231R. Resistor 249R being connected between condenser 243R and the grid 247R of thyratron tube 245R limits the flow of grid current that occurs when said thyratron fires to prevent damage to the thyratron. It might be well to point out that throughout the setup and operation of the machine, the operator need not be concerned about the technical principles involved. Controls are so provided that no theoretical knowledge is required. If resistor 241R and condenser 243R were not present, the output would change abruptly at the plate 232R of tube 231R, in accord with graph c of FIG. 17. But condenser 243R is charged to a voltage equal to the previous voltage of said plate and as soon as the voltage of the plate commences to rise, current is drawn by condenser 243R and this current must flow through resistor 241R and resistor 239R. Thus as tube 231R draws less current, this drop in current is supplanted in part by the demand for current by condenser 243R. This current flow is limited by the resistor 241R so that it requires time for condenser 243R to charge to the new voltage. During this time, the voltage graph between point $f$ and $g$ on graph $d$ rises as a segment of a straight line as shown in said graph. Before the condenser 243R is charged to the new value the next signal pulse is received and the action is repeated. Throughout the timing cycle the condenser 243R never quite charges to the value of the plate 232 so that after the first pulse the curve $d$, FIG. 17, runs parallel to the dotted line $m$ which represents the average slope of graph $c$. Graph $d$ is displaced below graph $b$. This displacement being a constant it can be exactly corrected by a similar displacement of the firing point of the trigger element from $n$ to $l$. Examination of FIG. 17 will show that with the interpolating circuit the trigger element will fire when line $d$ intercepts line $l$ at point $j$ which is the correct time since it falls directly under a theoretical point $o$ on the average slope line $m$ where it intercepts line $n$. However, if no interpolating circuit were employed, the actual firing point would be at $k$ on the step-like voltage graph $c$ which would be later than desired. These series of straight line segments denoted by points $f$, $g$, $h$, $i$, etc. form a continuous straight graph and when this line intersects the horizontal line $l$ (denoting the trigger voltage) at point $j$ the trigger means is actuated. Obviously point $j$ lies between point $h$ and $i$ so that point $j$ represents an interpolation in time. Eventually the signal reaches a point where the thyratron 245R fires. One side of the coil 334R of relay 333R is already connected to the 250 volt line 404 through conductor 329, contacts 327—328 of relay 320 while the other side of the coil is connected to the plate 246R of tube 245R. When this tube 245R fires it completes a circuit to ground through switch 252R, potentiometer 254R, one end of which is connected to the grounded conductor 259. This energizes relay 333R. The normally open contacts 338—336 apply 120 volts D.C.+ from conductor 402 to filter solenoid 195R. The action of this solenoid brings into the light stream a cyan filter which provides further exposure to blue and green light. At the same time, the normally closed pair of contacts 337R—335R open, removing one of the paths maintaining the current to the coil of relay 291.

Since the relay 333R and associated circuit is identical in design and operation with relays 333G and 333B, the last two relays act in a similar way, so that when all three exposures are completed the three parallel paths provided by contact pairs 335R—337R, 335G—337G and 335B—337B are all opened, releasing all of the relays 291, 292 and 293. This restores the timing circuit to its initial condition and ends the exposure portion of the printing cycle. The release of relay 293 releases in turn relay 343 by shorting the condenser 358 and coil 344 through resistor 361 which limits the surge current as contact 323 breaks with contact 318 and makes with contact 317.

When relay 343 releases contact 349 connected with condenser 354, now in a charged condition and makes contact with contact 346, this condenser is discharged through coil 372 of relay 366. Sufficient energy is thus provided to pulse relay 366. The contacts 374—373 now close and apply 120 volt direct current to the conductor 376. Connected to this conductor is the coil 367 of relay 364 which becomes energized when the relay 366 is pulsed. This closes the normally open contacts 371—369 of relay 364 and the feed mechanism solenoid 365 is energized. Energization of the feed solenoid causes the paper feed to start, while energizing relay 364 disconnects contact 371 from contact 368 releasing relay 382. Connecting contact 371 with contact 369 supplies current to feed solenoid 365 until action of the paper feed is completed, when mechanically operated switch 430 is opened by the arm 431 of the feed mechanism of the paper section C, breaking the source of +120 volt direct current to the feed solenoid 365 and coil 367 of relay 364.

While relay 364 is energized and paper is being fed, the release of relay 382 prevents restarting of the timers IR, IG and IB by interrupting the 24 volt alternating current through contacts 386—384. The timer completes its part of the cycle when all three relays 333R, 333G and 333B are energized.

It is to be understood that there is no particular order in which the several color channels will act to insert their color modifying filters, but regardless of the order, the printing portion of the cycle is ended when the last of relays 333R, 333G and 333B is energized, since this will interrupt the last remaining path for the current to the coils of the relays 291, 292 and 293 restoring these to their original condition.

After the relays 333R, 333G and 333B are energized, they are momentarily held in this condition by keeping the thyratrons in a conducting state temporarily. During the exposure period and while relay 320 is energized, the condenser 433 is charged through resistor 432, so that when contacts 321—315 of relay 293 are opened, the energy stored in this condenser supplies current to coil 326 and maintains relay 320 in energized condition. However, this flow of current quickly discharges the condenser and permits relay 320 to open after said delay. The reason for providing this momentary delay can be best understood by assuming it was absent, and that the operator maintained the foot switch 288 in closed condition. Upon the completion of the first printing cycle, at which time the three relays 333R, 333G and 333B would break the circuits that hold the relays 291, 292 and 293 in energized condition and the last mentioned relays would return to normal, relay 320 would open and restore relays 333R, 333G and 333B to normal. The foot switch being still closed, a new printing cycle would commence at once, before the interlock and feed portion of the cycle can operate. To avoid this, it is necessary that relay 366, relay 364 energize in turn and finally relay 382 release before relays 333R, 333G and 333B are released. The delayed release of relay 320 described above provides this condition. During the time the interlock relay 382 is deenergized contact 387 is connected to contact 380. This supplies +120 volts direct current to condenser 392 through resistor 394. Thus this condenser is charged during the paper feeding portion of the cycle. When relay 382 is reenergized at completion of the paper feeding cycle, this charged condenser 392 is connected by contact 387 with contact 385 and discharges into condenser 396 through resistor 389. Since condenser 396 is connected across coil 413 of relay 412, this relay is pulsed after a time delay. The normally open contacts 415—414 of relay 412 supply +120 volts direct current during the pulse closing of this relay to the marker solenoid 410. As soon as the voltage in condenser 396 falls below the drop-out voltage of relay 412, this relay becomes deenergized and the marker solenoid 410 released.

It is to be understood that while I have shown a version of my invention which operates to supply a modifying exposure of colored light to complete the printing operation, other methods well known in the art can be used in the instant invention with equal success.

Figure 14:
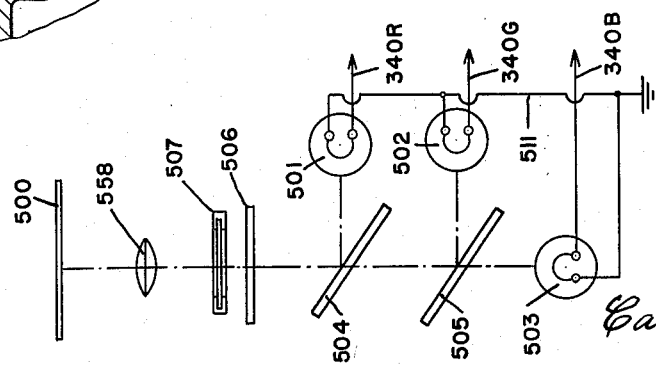
FIG. 14 is a diagrammatic view of a modification of the invention.

For example, FIG. 14 shows an illuminating system in which three separate bulbs 501, 502 and 503 are employed. These bulbs are colored red, green and blue. Cooperating therewith are reflectors 504 and 505 which are semi-transparent mirrors having the property of transmitting light of one color and reflecting light of another color. Such mirrors are sometimes called dichroic mirrors and are made by applying an optical interference coating to a transparent base such as glass. In the particular arrangement shown, reflector 504 would be constructed to reflect red light and transmit or pass cyan light. Reflector 505 would reflect green light and pass blue light.

Following the reflector, an optical diffuser 506 would be employed and then an image bearing support 507, similar to negative holder E, and an objective lens system 558. In operation, blue light would be supplied by the bulb 503 and pass freely through both reflectors. Light from the green bulb 502 would be reflected from reflector 505 and mix with the blue light stream and thereafter follow an identical path. Similarly, red light from bulb 501 would be reflected from reflector 504 and mix with the other colored light components to form the printing light and the composite light stream would pass through the diffuser 506, the negative in the holder 507, the objective lens system 558 and finally reach the sensitized paper indicated by the reference numeral 500. During part of the exposure time all bulbs being energized would provide the white light exposure phase, while extinguishing one or two lights would permit the remaining bulbs to provide the colored light exposure for modifying purposes. Operation of the device is procured by connecting one terminal of each bulb to ground by means of a conductor 511 and the other terminals of the bulbs to contacts 340R, 340G and 340B of relays 333R, 333G and 333B. Further solenoids 195R, 195G and 195B as well as lamp 70 and resistor 300 would be eliminated and the respective circuits therefor omitted. The action of each of said relays would terminate the component exposure. Naturally with this form of the invention, no filter mechanism would be required.

The printer so far described will produce corrected prints from negatives of various densities corresponding to a considerable range of over and under exposure. However, due to imperfections in the materials presently in use, a shift in both color and density occurs in printing grossly over or under exposed negatives, and I have invented a means for compensating for such grossly over and under exposed negatives during printing. Prints from such negatives exhibit a color shift in one direction if under exposed and in the opposite direction is over exposed. Using Kodacolor type C material this color shift is toward green with over exposed negatives and toward the green complement, magenta, with under exposed negatives, requiring shortening of the green component exposure for under exposed negatives and lengthening of the green component exposure in over exposed negatives. In each channel an adjustable resistance such as 214G is provided in series with the summing condenser 227G, so that when the photo cell signal current flows through this resistor a voltage appears across it and this voltage is added to the voltage of the charge in the condenser 227G. Hence, whenever a thin (under exposed) negative is being printed a large signal will be applied by resistor 214R and with a dense (over exposed) negative the signal will be small. If the negative is very thin this voltage may be strong enough to produce half of the required firing signal, so that the summing condenser need only supply the other half. Consequently the firing voltage is reached sooner with the help of this added voltage and thus shortens the green exposure whenever a very thin negative is printed. This shorter exposure also aids in producing a slightly lighter print which is also desirable. With a normal negative a medium signal is added to the voltage of the summing condenser. While with a dense negative the added voltage is negligible and the full time is required for the summing condenser to produce the firing voltage. The value of the added voltage produced by the resistor is dependent upon the setting of the adjustment of said resistor. The medium signal corresponding to a normal negative would introduce a shift to the green but this is now overcome by readjusting the green channel biases upward until the combined resistor voltage and summing condenser voltage produces a good print. Now a high signal will produce added green, a normal signal will be in good balance and a low signal will introduce a shift away from green. Since the photo cell signal in this printer is received as a series of pulses, a condenser 217G is connected in parallel across resistor 214G so that during the signal pulse this condenser is charged up and stores this charge, returning it to the circuit during the interval between pulses. This smooths out the added voltage and makes it more nearly constant. It has been found that a suitable combination of values would be 0.1 $\mu$f. for condenser 217G and a setting of about 250K for adjustable resistor 214G. Resistors 217R and 217B are set at zero resistance. With materials of other manufacture other values may be employed in any or all of the channels.

Further, control of the compensation characteristics to suit other timing circuits and/or materials may be altered by employing resistive elements which are variable such as "Thyrite" in which the resistance varies as a constant times the voltage to the $n$th power, or diodes, either alone or combined with ordinary resistors and/or condensers.

The advantages of the invention are manifest. Color balance can be adjusted independently of density and, similarly, density can be adjusted independently of color balance. Adjustments for different batches of emulsions can be made without disturbing either color balance or density, as for example, when different widths of paper are employed. Preset adjustments can be made to compensate for different types of illumination without affecting other adjustments. The photo-electric cell automatically adjusts for both density and color balance with the average negative. However, manual overriding controls are provided which permits of printing abnormal negatives. The electric portion of the invention operates on sufficiently strong signals so that variation in the values of components due to changes in temperature and current leakage due to changes in humidity do not affect the reliability of the machine. The apparatus can be operated in daylight. By using a single photo-electric cell, the necessity of matching a plurality of cells and maintaining properly adjusted operating conditions for the various cells is eliminated. The photo cell reads the entire area of the negative so that the average condition of the entire negative is utilized in procuring the proper printing exposure. The photo cell reads the light intensity continuously during exposure so that automatic compensation for variation in line voltage results. An interlock is provided between the printing portion of the cycle and the paper feeding portion of the cycle so as to prevent conflicting operation between the printing and paper feeding sections of the invention. Programming controls are provided for initiating paper feeding and print marking. The negative is securely held in position during the printing cycle. A pulse type of signal fed to the timing means is converted to provide continuous linear operation so that infinite increments of printing periods may be had. The apparatus is foolproof in operation.

Changes in the specific form of the invention, as herein described, may be made within the scope of what is claimed without departing from the spirit of the invention.

Having described the invention, what is claimed as new and desired to be protected by Letters Patent is:

1. A photographic printer for color printing comprising a holder for an image bearing support, means for supporting multiple sensitized photographic material in spaced relation to said support, illuminating means forming a composite light stream containing a plurality of light-components of different wave lengths for illuminating said support, an objective lens system gathering light from said support and focusing the same to form a printing beam and transmitting the said beam to the sensitized material to form a projected image thereon, a single photo cell, a beam splitter disposed in the path of the projected light stream and diverting a sample beam of the same to said photo cell, a plurality of analyzing filters supported for successive movement into and out of the path of said sample beam, individual cut-off means for individually cutting off each of said light-components, a shutter disposed between said beam splitter and said image bearing support, means for opening said shutter to start a printing cycle, switches corresponding with said analyzing filters and functioning while said filters are in the path of said sample beam, a plurality of photo cell circuits each connected to one of said switches and receiving signals from said photo cell, summing means connected to said photo cell circuits and storing the energy derived therefrom, separate trigger circuits individually actuated by the energy from said summing means and each actuating one of said cut-off means, and shutter operating means operable upon the operation of all of said cut-off means and closing said shutter.

2. A photographic printer for color printing comprising a holder for an image bearing support, means for supporting multiple sensitized photographic material in spaced relation to said support, illuminating means forming a composite light stream containing a plurality of light-components of different wave lengths for illuminating said support, an objective lens system gathering light from said support and focusing the same to form a printing beam and transmitting said beam to the sensitized material to form a projected image thereon, a rotating cup having a cylindrical wall formed with windows therein, equally spaced circumferentially, analyzing filters in said windows, means intercepting a portion of the light transmitted from the image bearing support and directing it toward said cup from one side thereof to cause said light to successively pass through said filters, means connected to and rotating said cup, a single photo cell disposed within said cup and in the path of the light passing through said filters, normally inoperative switches corresponding with said analyzing filters, means rotatable with said cup and rendering said switches operable when the corresponding filters are in light conducting position, said switches controlling the output of said photo cell, a plurality of photo cell circuits each controlled by one of said switches, and light modifying means for varying the amount of light from each of said light-components reaching to sensitized material during a printing period and actuated by said photo cell circuits.

3. A photographic printer for color printing comprising a holder for an image bearing support, means for supporting multiple sensitized photographic material in spaced relation to said support, illuminating means forming a composite light stream containing a plurality of light-components of different wave lengths for illuminating said support, an objective lens system gathering light from said support and focusing the same to form a printing beam and transmitting said beam to the sensitized material to form a projected image thereon, a rotating cup having a cylindrical wall formed with windows therein, equally spaced circumferentially, analyzing filters in said windows, said cup having opaque portions therein between said filters, means intercepting a portion of the light transmitted from the image bearing support and directing it toward said cup from one side thereof to cause said light to successively pass through said filters, means connected to and rotating said cup, a single photo cell disposed within said cup and in the path of the light passing through said filters, said opaque portion blocking the light directed toward said photo cell during movement of the filters into and out of the path of the light directed toward said photo cell, normally inoperative switches corresponding with said analyzing filters, means rotatable with said cup and rendering said switches operable when the corresponding filters are in light conducting position, said switches controlling the output of said photo cell, a plurality of photo cell circuits each controlled by one of said switches, and light modifying means for varying the amount of light from each of said light-components reaching the sensitized material during a printing period and actuated by said photo cell circuits.

4. A photographic printer for color printing comprising a holder for an image bearing support, means for supporting multiple sensitized photographic material in spaced relation to said support, illuminating means forming a composite light stream containing a plurality of light-components of different wave lengths for illuminating said support, an objective lens system gathering light from said support and focusing the same to form a printing beam and transmitting said beam to the sensitized material to form a projected image thereon, a rotating cup having a cylindrical wall formed with windows therein, equally spaced circumferentially, analyzing filters in said windows and substantially equally spaced from the axis of rotation of said cup, means intercepting a portion of the light transmitted from the image bearing support and directing it toward said cup from one side thereof to cause said light to successively pass through said filters, means connected to and rotating said cup, a single photo cell disposed within said cup and in the path of the light passing through said filters, normally inoperative switches corresponding with said analyzing filters, means rotatable with said cup and rendering said switches operable when the corresponding filters are in light conducting position, said switches controlling the output of said photo cell, a plurality of photo cell circuits each controlled by one of said switches, and light modifying means for varying the amount of light from each of said light-components reaching the sensitized material during a printing period and actuated by said photo cell circuits.

5. A photographic printer for color printing comprising a holder for an image bearing support, means for supporting multiple sensitized photographic material in spaced relation to said support, illuminating means forming a composite light stream containing a plurality of light-components of different wave lengths for illuminating said support, an objective lens system gathering light from said support and focusing the same to form a printing beam and transmitting said beam to the sensitized material to form a projected image thereon, a rotating cup having a cylindrical wall formed with windows therein, equally spaced circumferentially, analyzing filters in said windows, means intercepting a portion of the light transmitted from the image bearing support and directing it toward said cup from one side thereof to cause said light to successively pass through said filters, means connected to and rotating said cup, a single photo cell disposed within said cup and in the path of the light passing through said filters, normally inoperative switches corresponding with said analyzing filters, cams rotatable with said cup and successively rendering said switches operable when the corresponding filters are in light conducting position, said switches controlling the output of said photo cell, a plurality of photo cell circuits each controlled by one of said switches, and light modifying means for varying the amount of light from each of said light-components reaching the sensitized material during a printing period and actuated by said photo cell circuits.

6. A photographic printer for color printing comprising a holder for an image bearing support, means for supporting multiple sensitized photographic material in printing relation to said support, illuminating means forming a composite light stream containing a plurality of light-components of different wave lengths for illuminating said support, a single photo cell positioned to receive a sample beam of the light transmitted toward the sensitized material, a plurality of analyzing filters supported for movement into and out of the path of said sample beam, switches corresponding with said analyzing filters and functioning while said filters are in the path of said sample beam, means operating during each printing period for successively and repeatedly moving said filters into and out of said path and operating said switches in synchronism therewith, a plurality of photo cell circuits each connected to one of said switches and receiving signals from said photo cell, individual cut-off means for individually cutting off each of said light-components, summing circuits one for each light-component and receiving energy from said photo cell circuits, said summing circuits producing increasing output voltages from the signals received from said photo cell, electronic buffer valves having input and output elements, said voltages being impressed on the input elements thereof and trigger circuits connected to the output elements and including an electronic trigger valve having input and output elements, said trigger valve upon being fired operating said cut-off means.

7. A photographic printer for color printing comprising a holder for an image bearing support, means for supporting multiple sensitized photographic material in printing relation to said support, illuminating means forming a composite light stream containing a plurality of light-components of different wave lengths for illuminating said support, a single photo cell positioned to receive a sample beam of the light transmitted toward the sensitized material, a plurality of analyzing filters supported for movement into and out of the path of said sample beam, switches corresponding with said analyzing filters and functioning while said filters are in the path of said sample beam, a plurality of photo cell circuits each connected to one of said switches and receiving signals from said photo cell, individual cut-off means for individually cutting off each of said light-components, summing circuits one for each light-component and receiving energy from said photo cell circuits, said summing circuits producing increasing output voltages from the signals received from said photo cell, electronic buffer valves having input and output elements, said voltages being impressed on the input elements thereof and trigger circuits connected to the output elements, said triggers circuits upon actuation operating said cut-off means and interpolating circuits disposed between and connected to said electronic valves and said trigger circuits.

8. A photographic printer for color printing comprising a holder for an image bearing support, means for supporting multiple sensitized photographic material in printing relation to said support, illuminating means forming a composite light stream containing a plurality of light-components of different wave lengths for illuminating said support, a single photo cell positioned to receive a sample beam of the light transmitted toward the sensitized material, a plurality of analyzing filters supported for movement into and out of the path of said sample beam, switches corresponding with said analyzing filters and functioning while said filters are in the path of said sample beam, a plurality of photo cell circuits each connected to one of said switches and receiving signals from said photo cell, individual cut-off means for individually cutting off each of said light-components, summing circuits one for each light-component and receiving energy from said photo cell circuits, said summing circuits producing increasing output voltages from the signals received from said photo cell, electronic buffer valves having input and output elements, said voltages being impressed on the input elements thereof and trigger circuits connected to the output elements and including an electronic trigger valve having input and output elements, said trigger valve upon being fired operating said cut-off means and trigger circuits including electronic trigger tubes having input and output elements, interpolating circuits between said buffer circuits and said trigger circuits, said interpolating circuits being connected to the output elements of said buffer valves and to the input elements of said trigger valves and the output elements of said trigger valves being connected to said cut-off means.

9. A photographic printer for color printing comprising a holder for an image bearing support, means for supporting multiple sensitized photographic material in printing relation to said support, illuminating means forming a composite light stream containing a plurality of light-components of different wave lengths for illuminating said support, a single photo cell positioned to receive a sample beam of the light transmitted toward the sensitized material, a plurality of analyzing filters supported for movement into and out of the path of said sample beam, switches corresponding with said analyzing filters and functioning while said filters are in the path of said sample beam, a plurality of photo cell circuits each connected to one of said switches and receiving signals from said photo cell, individual cut-off means for individually cutting off each of said light-components, summing circuits one for each light-component and receiving energy from said photo cell circuits, said summing circuits producing increasing output voltages from the signals received from said photo cell, electronic buffer valves having input and output elements, said voltages being impressed on the input elements thereof, the output elements of said buffer valves being connected to dropping resistors which in turn are connected to a source of voltage, trigger circuits including electronic trigger valves, interpolating circuits between said buffer circuits and said trigger circuits, said interpolating circuits including resistors connected to the output elements of said buffer valves, and to the input elements of said trigger valves, and condensers connected to said ressitors and shunting the inputs to said trigger valves to ground.

10. A photographic printer for color printing comprising a holder for an image bearing support, means for supporting multiple sensitized photographic material in spaced relation to said support, illuminating means forming a composite light stream containing a plurality of light-components of different wave lengths for illuminating said support, an objective lens system gathering light from said support and focusing the same to form a printing beam and transmitting the said beam to the sensitized material to form a projected image thereon, a single photo cell, a beam splitter disposed in the path of the projected light stream and diverting a sample beam of the same to said photo cell, a field lens disposed between said beam splitter and said photo cell and serving to reimage the diaphragm stop of the objective lens in substantially the plane of the photo cell cathode, a plurality of analyzing filters supported for successive movement into and out of the path of said sample beam, individual cut-off means for individually cutting off each of said light-components, a shutter disposed between said beam splitter and said image bearing support, means for opening said shutter to start a printing cycle, switches corresponding with said analyzing filters and functioning while said filters are in the path of said sample beam, a plurality of photo cell circuits each connected to one of said switches and receiving signals from said photo cell, summing means connected to said photo cell circuits and storing the energy derived therefrom, separate trigger circuits individually actuated by the energy from said summing means and each actuating one of said cut-off means, and shutter operating means operable upon the operation of all of said cut-off means and closing said shutter.

11. A photographic printer for color printing comprising a holder for an image bearing support, means for supporting multiple sensitized photographic material in spaced relation to said support, illuminating means forming a composite light stream containing a plurality of light-components of different wave lengths for illuminating said support, an objective lens system gathering light from said support and focusing the same to form a printing beam and transmitting the said beam to the sensitized material to form a projected image thereon, a single photo cell, a beam splitter disposed in the path of the projected light stream and diverting a sample beam of the same to said photo cell, a plurality of analyzing filters supported for successive movement into and out of the path of said sample beam, individual cut-off means for individually cutting off each of said light-components, a shutter disposed between said beam splitter and said image bearing support, means for opening said shutter to start a printing cycle, switches corresponding with said analyzing filters and functioning while said filters are in the path of said sample beam, a plurality of photo cell circuits each connected to one of said switches and receiving signals from said photo cell, summing means connected to said photo cell circuits and storing the energy derived therefrom, trigger circuits actuated by said summing means and actuating said cut-off means individually, shutter operating means operable by the last to operate trigger means for closing said shutter.

References Cited in the file of this patent

UNITED STATES PATENTS

| | | |
|---|---|---|
| 1,973,512 | Smith | Sept. 11, 1934 |
| 2,375,213 | McChilton | May 8, 1945 |
| 2,438,303 | Simmon | Mar. 23, 1948 |
| 2,500,049 | Williams et al. | Mar. 7, 1950 |
| 2,521,954 | Tuttle et al. | Sept. 12, 1950 |
| 2,691,917 | Curry | Oct. 19, 1954 |
| 2,757,571 | Loughren | Aug. 7, 1956 |
| 2,921,498 | Simmon et al. | Jan. 19, 1960 |

FOREIGN PATENTS

| | | |
|---|---|---|
| 1,173,295 | France | Oct. 27, 1958 |